(12) United States Patent
Jeong et al.

(10) Patent No.: US 10,739,499 B2
(45) Date of Patent: Aug. 11, 2020

(54) DISPLAY APPARATUS

(71) Applicant: LG ELECTRONICS INC., Seoul (KR)

(72) Inventors: Chansung Jeong, Seoul (KR); Sangtae Park, Seoul (KR); Myeongwook Bae, Seoul (KR); Dongjin Yoon, Seoul (KR); Munseok Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 16/018,980

(22) Filed: Jun. 26, 2018

(65) Prior Publication Data

US 2019/0004216 A1 Jan. 3, 2019

(30) Foreign Application Priority Data

Jun. 30, 2017 (KR) ........................ 10-2017-0083630

(51) Int. Cl.
| | | |
|---|---|---|
| *G02B 3/08* | (2006.01) | |
| *G06F 1/16* | (2006.01) | |
| *H04M 1/02* | (2006.01) | |
| *G02B 5/04* | (2006.01) | |
| *G02F 1/1333* | (2006.01) | |
| *G02F 1/1335* | (2006.01) | |

(52) U.S. Cl.
CPC .............. *G02B 3/08* (2013.01); *G02B 5/045* (2013.01); *G06F 1/1601* (2013.01); *G06F 1/1637* (2013.01); *H04M 1/0266* (2013.01); *G02F 1/13336* (2013.01); *G02F 1/133526* (2013.01); *G02F 2001/133388* (2013.01)

(58) Field of Classification Search
CPC ...... G02B 13/18; G02B 3/04; G02B 13/0045; G02B 13/004; G02B 13/0035

USPC ........................................................ 359/708
See application file for complete search history.

(56) References Cited

U.S. PATENT DOCUMENTS

2012/0062996 A1* 3/2012 Kim .................. G02B 1/111
                                                            359/601
2015/0370133 A1* 12/2015 Kim .................. G02F 1/133608
                                                            362/97.1

FOREIGN PATENT DOCUMENTS

| JP | 2012150366 | 8/2012 |
|---|---|---|
| KR | 1020150008666 | 1/2015 |
| KR | 1020150019841 | 2/2015 |
| KR | 1020160141109 | 12/2016 |

(Continued)

OTHER PUBLICATIONS

PCT International Application No. PCT/KR2018/007388, International Search Report dated Oct. 2, 2018, 3 pages.

*Primary Examiner* — Mohammed A Hasan
(74) *Attorney, Agent, or Firm* — Lee, Hong, Degerman, Kang & Waimey PC

(57) ABSTRACT

A display apparatus is disclosed. The display apparatus includes a display including an active area for displaying an image and a black matrix adjacent to the active area, and an optical sheet attached onto the display. The optical sheet includes a Fresnel pattern formed on the black matrix and a portion of the active area. The Fresnel pattern includes a plurality of peaks and a plurality of valleys, which are formed such that depths between the peaks and the valleys gradually increase from the active area to the black matrix. Therefore, it is possible to view an image in front of the black matrix, on which an image is not actually displayed.

27 Claims, 17 Drawing Sheets

(56) References Cited

FOREIGN PATENT DOCUMENTS

KR    1020160141110    12/2016

\* cited by examiner

B1a

B1c

DISPLAY APPARATUS

CROSS-REFERENCE TO RELATED APPLICATION

Pursuant to 35 U.S.C. § 119(a), this application claims the benefit of earlier filing date and right of priority to Korean Patent Application No. 10-2017-0083630, filed on Jun. 30, 2017, the contents of which are hereby incorporated by reference herein in its entirety.

BACKGROUND OF THE INVENTION

1. Field of the Invention

The present invention relates to a display apparatus, and more particularly to a display apparatus that enables a user to view an image in front of a black matrix, on which an image is not actually displayed.

2. Description of the Related Art

Display apparatuses are apparatuses that output images. Display apparatuses employ various image-output methods, including, for example, a method of outputting images through a display panel, a method of projecting images to the outside using visible light, etc.

Meanwhile, there is an increasing tendency to dispose a display apparatus outdoors for commercial purposes.

In many cases, a commercial display apparatus is structured such that a plurality of displays is consecutively arranged.

However, there is a problem in that the immersion level with respect to the image displayed on a plurality of displays is low due to bezels provided around the displays.

Accordingly, efforts are being made to reduce the size of a bezel around a display.

SUMMARY OF THE INVENTION

Therefore, the present invention has been made in view of the above problems, and it is an object of the present invention to provide a display apparatus that enables a user to view an image in front of a black matrix, on which an image is not actually displayed.

It is another object of the present invention to provide a display apparatus that enables a user to view an image in front of a bezel, on which an image is not actually displayed, thereby exhibiting the same effect as minimizing the size of the bezel.

In accordance with an aspect of the present invention, the above and other objects can be accomplished by the provision of a display apparatus including a display including an active area for displaying an image and a black matrix adjacent to the active area, and an optical sheet attached onto the display, wherein the optical sheet includes a Fresnel pattern formed on the black matrix and a portion of the active area, and the Fresnel pattern includes a plurality of peaks and a plurality of valleys, which are formed such that depths between the peaks and the valleys gradually increase from the active area to the black matrix.

In accordance with another aspect of the present invention, there is provided a display apparatus including a plurality of displays, each including an active area for displaying an image and a black matrix adjacent to the active area, and an optical sheet attached onto each of the displays, wherein the optical sheet includes a Fresnel pattern formed on the black matrix and a portion of the active area, and the Fresnel pattern includes a plurality of peaks and a plurality of valleys, which are formed such that depths between the peaks and the valleys gradually increase from the active area to the black matrix.

In accordance with a further aspect of the present invention, there is provided a display apparatus including a display including an active area for displaying an image and a black matrix adjacent to the active area, and a glass substrate attached onto the display, wherein the glass substrate includes a Fresnel pattern formed on the black matrix and a portion of the active area, and the Fresnel pattern includes a plurality of peaks and a plurality of valleys, which are formed such that depths between the peaks and the valleys gradually increase from the active area to the black matrix.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In the following description of the present invention, the suffixes "module" and "unit" that are mentioned in the elements used to describe the present invention are merely used for the purpose of simplifying the description of the present invention. The suffix itself is not assigned with a particularly significant meaning or function. Therefore, the suffixes "module" and "unit" may also be alternately used for reference to a specific element of the present invention.

Figure 1A:
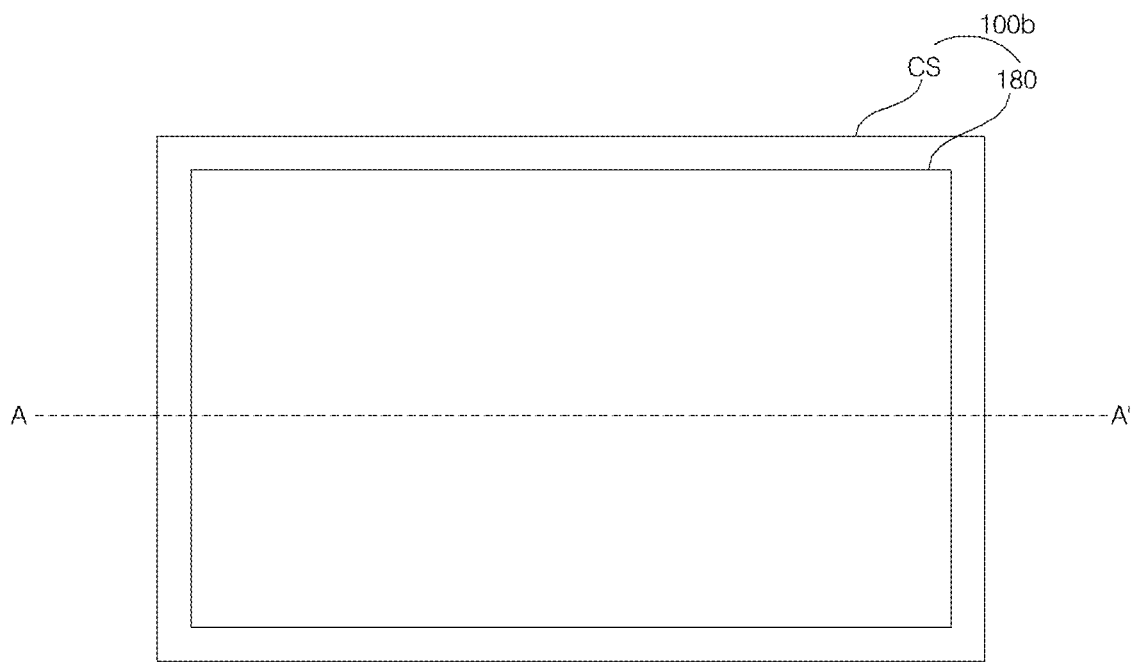
FIG. 1A is a view illustrating the external appearance of a display apparatus related to the present invention.
Figure 1B:
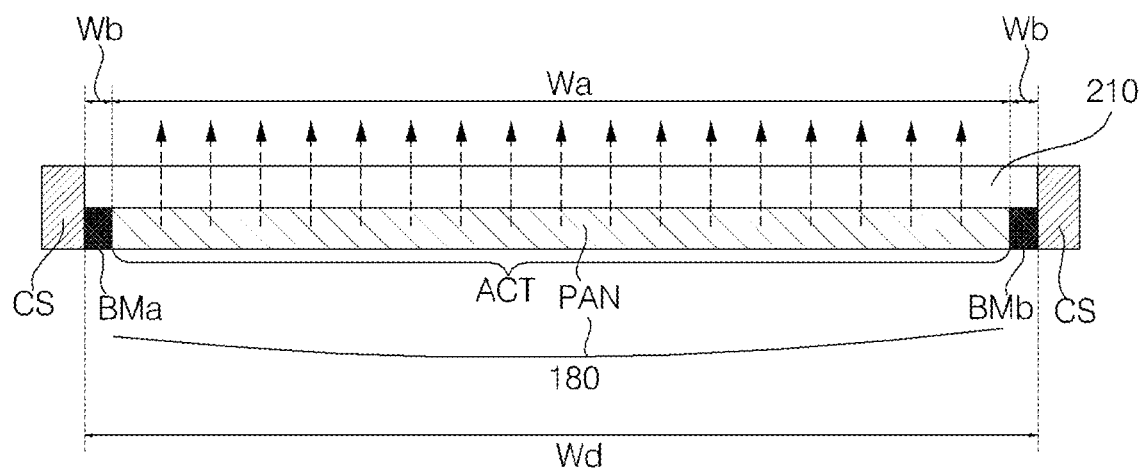
FIG. 1B is a sectional view taken along line A-A' in FIG. 1A.

FIG. 1A is a view illustrating the external appearance of a display apparatus related to the present invention, and FIG. 1B is a sectional view taken along line A-A' in FIG. 1A.

Referring to the drawings, a display apparatus 100b shown in FIG. 1A may include a display 180 and a bezel CS disposed around the display 180.

The display 180, as shown in FIG. 1B, may include an active area ACT, which corresponds to a panel PAN, on which an image is displayed, and black matrices BMa and BMb, which are arranged at the left and right sides of the active area ACT.

The display apparatus 100b may further include an optical sheet 210, which is disposed on the active area ACT and the black matrices BMa and BMb of the display 180.

The bezel CS may be formed along the sides of the optical sheet 210 and the sides of the black matrices BMa and BMb.

According to the structure shown in FIGS. 1A and 1B, since an image is displayed on the active area ACT, light is output in a straight direction.

Meanwhile, according to the structure shown in FIGS. 1A and 1B, since an image is not displayed on the black matrices BMa and BMb, it is almost impossible to view an image in front of the black matrices BMa and BMb.

Most of the light output from the active area ACT travels in a straight direction, and some of the light may be output in an inclined direction toward the black matrices BMa and BMb. However, in this case as well, it is almost impossible to view an image in front of the black matrices BMa and BMb.

Figure 2A:
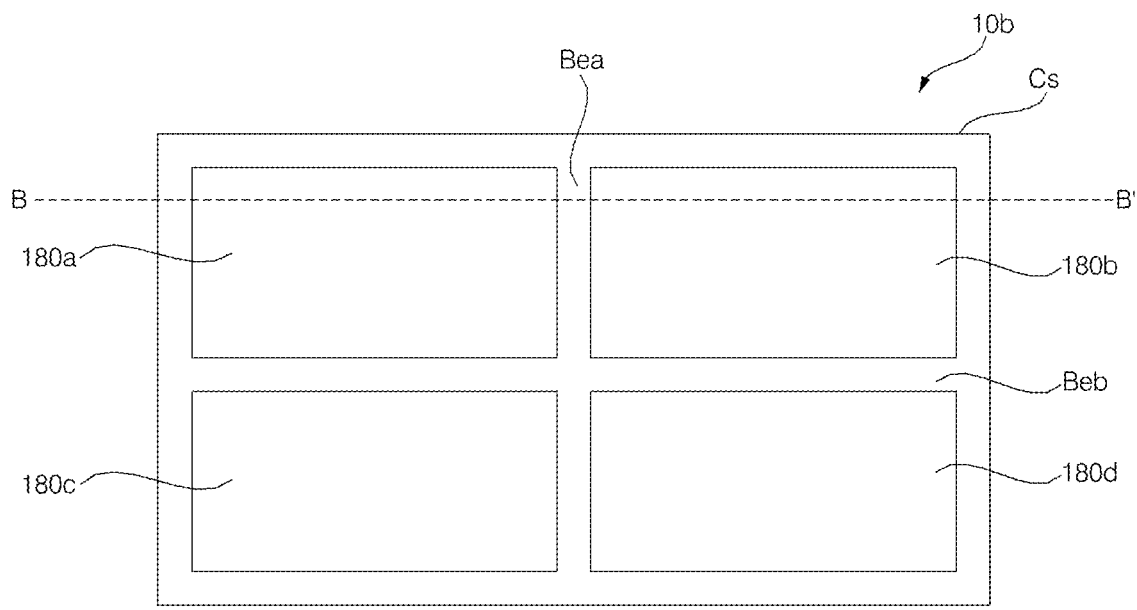
FIG. 2A is a view illustrating the external appearance of a display apparatus related to the present invention.
Figure 2B:
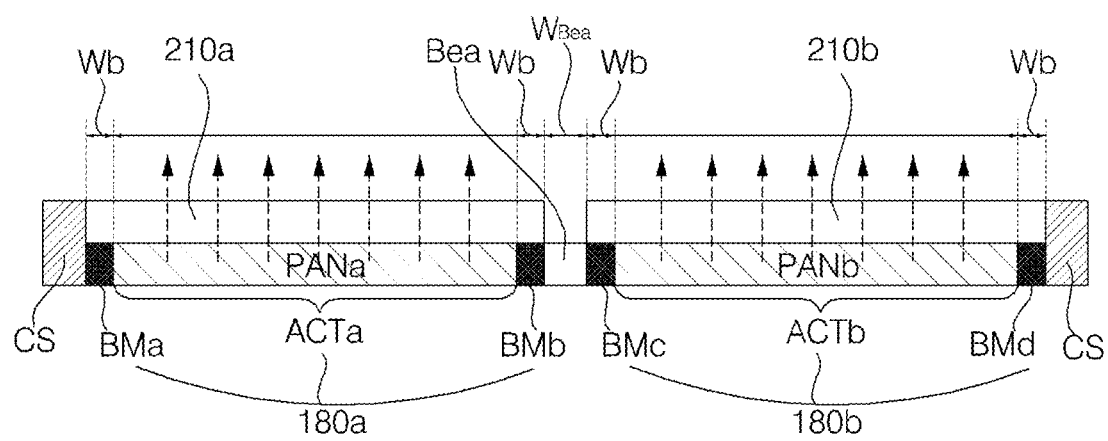
FIG. 2B is a sectional view taken along line B-B' in FIG. 2A.

FIG. 2A is a view illustrating the external appearance of a display apparatus related to the present invention, and FIG. 2B is a sectional view taken along line B-B' in FIG. 2A.

Referring to the drawings, a display apparatus 10b shown in FIG. 2A may include a plurality of displays 180a to 180d, bezels Bea and Beb disposed between the displays 180a to 180d, and a bezel CS disposed around the displays 180a to 180d.

Among the displays 180a to 180d, first and second displays 180a and 180b, as shown in FIG. 2B, may include active areas ACTa and ACTb, which correspond to panels PANa and PANb, on which an image is displayed, and black matrices BMa, BMb, BMc and BMd, which are arranged at the left and right sides of the active areas ACTa and ACTb.

The display apparatus 10b, as shown in FIG. 2B, may further include optical sheets 210a and 210b, which are disposed on the active areas ACTa and ACTb and the black matrices BMa, BMb, BMc and BMd.

The bezel CS may be formed along the sides of the optical sheets 210a and 210b and the sides of the black matrices BMa and BMd.

According to the structure shown in FIG. 2B, since an image is displayed on the active areas ACTa and ACTb, light is output in a straight direction.

Meanwhile, according to the structure shown in FIG. 2B, since an image is not displayed on the black matrices BMa, BMb, BMc and BMd, it is almost impossible to view an image in front of the black matrices BMa, BMb, BMc and BMd.

Most of the light output from the active areas ACTa and ACTb travels in a straight direction, and some of the light may be output in an inclined direction toward the black matrices BMa, BMb, BMc and BMd. However, in this case as well, it is almost impossible to view an image in front of the black matrices BMa, BMb, BMc and BMd. Further, it is also almost impossible to view an image in front of the bezel Bea that is arranged between the first display 180a and the second display 180b.

In particular, there is a problem in that the bezel Bea between the first display 180a and the second display 180b deteriorates the immersion level with respect to an image displayed near the bezel Bea between the first display 180a and the second display 180b.

Therefore, the present invention provides a display apparatus that enables a user to view an image in front of a black matrix, on which an image is not actually displayed.

Further, the present invention provides a display apparatus that enables a user to view an image in front of a bezel, on which an image is not actually displayed, thereby exhibiting the same effect as minimizing the size of the bezel.

Figure 3:
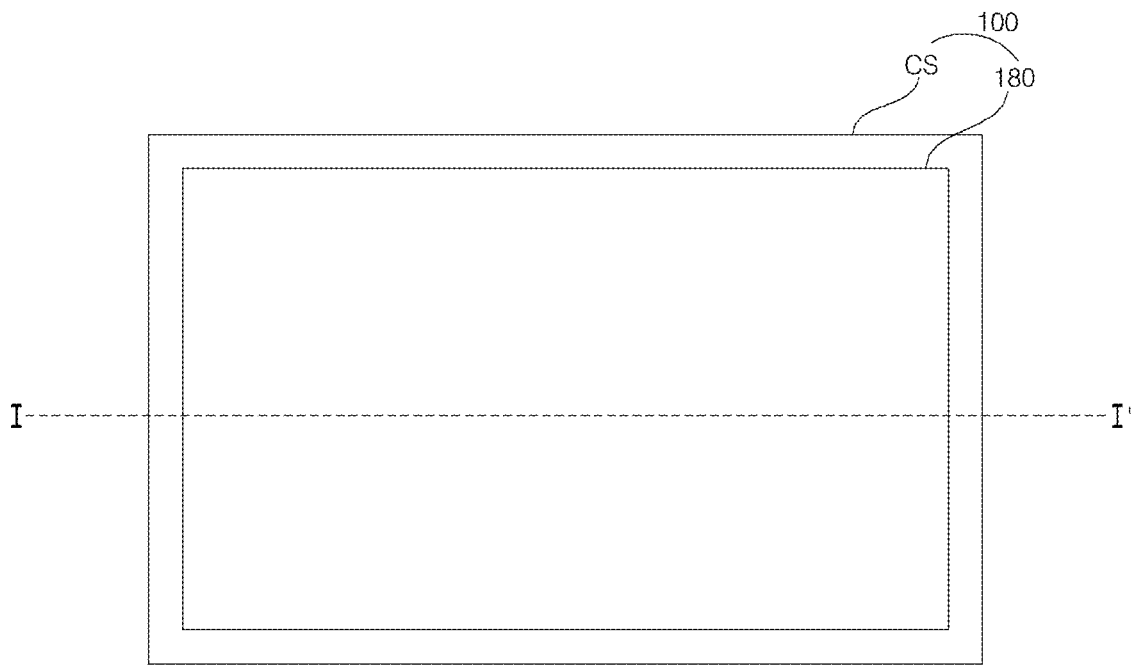
FIG. 3 is a view illustrating the external appearance of a display apparatus according to one embodiment of the present invention.
Figure 4:
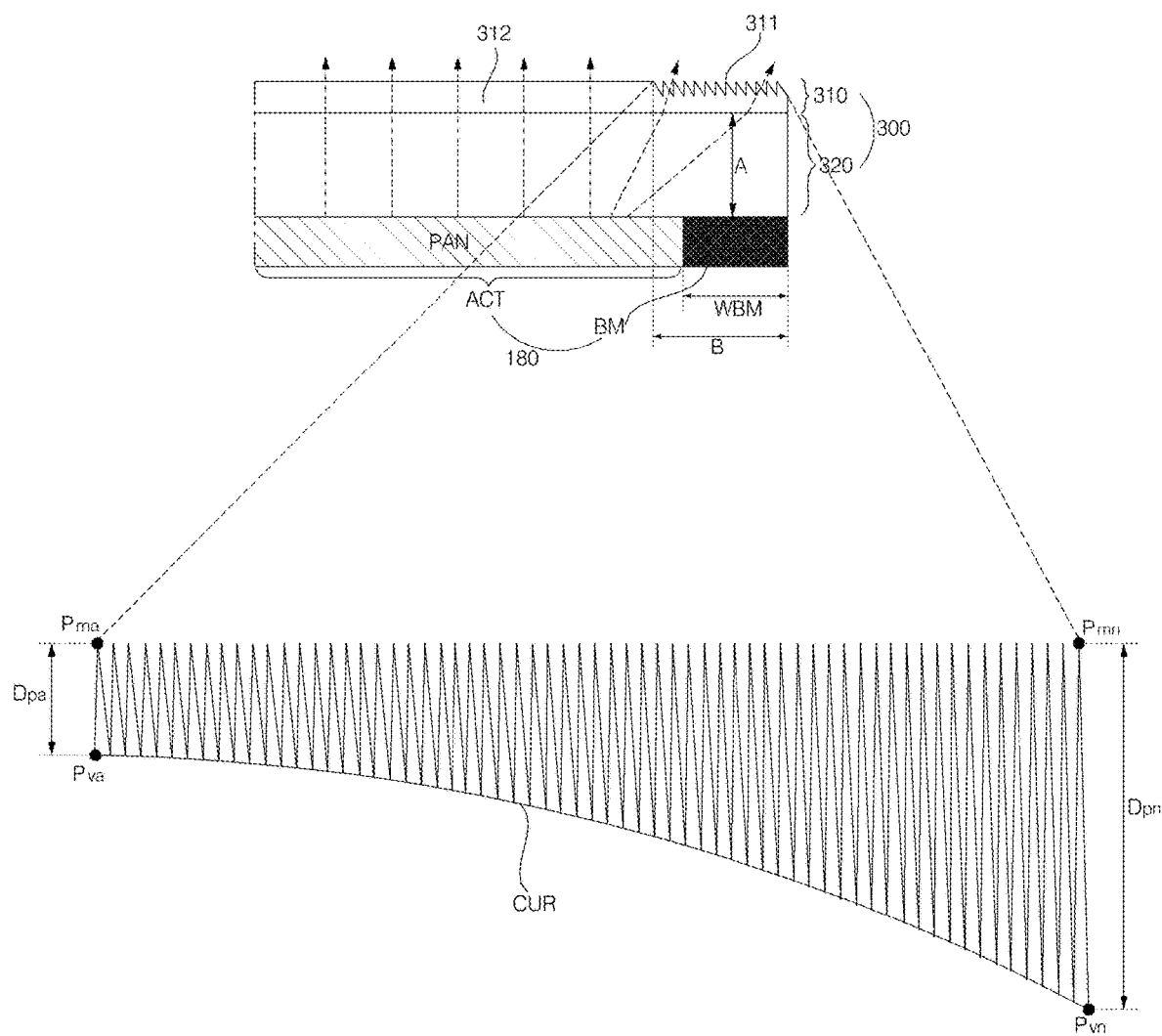
FIG. 4 is a sectional view taken along line I-I' in FIG. 3.

FIG. 3 is a view illustrating the external appearance of a display apparatus according to one embodiment of the present invention, and FIG. 4 is a sectional view taken along line I-I' in FIG. 3.

Referring to the drawings, a display apparatus 100 shown in FIG. 3 may include a display 180 and a bezel CS disposed around the display 180.

The display 180, as shown in FIG. 4, may include an active area ACT, which corresponds to a panel PAN, on which an image is displayed, and a black matrix BM, which is arranged at each of the left and right sides of the active area ACT.

The display apparatus 100 may further include an optical sheet 300, which is disposed on the active area ACT and the black matrix BM of the display 180.

The optical sheet 300 according to one embodiment of the present invention includes a Fresnel pattern 311, which is formed on the black matrix BM and a portion of the active area ACT. The Fresnel pattern 311 includes a plurality of peaks Pma to Pmn and a plurality of valleys Pva to Pvn. The depths Dpa to Dpn between the peaks and the valleys gradually increase from the active area ACT to the black matrix BM.

Specifically, as shown in the enlarged view in FIG. 4, from the active area ACT to the black matrix BM, the heights of the peaks Pma to Pmn are constant, and the heights of the valleys Pva to Pvn gradually decrease, with the result that the depths Dpa to Dpn between the peaks and the valleys increase.

As such, since the depths Dpa to Dpn between the peaks and the valleys in the Fresnel pattern 311 gradually increase from the active area ACT to the black matrix BM, the degree of refraction of light output from the active area ACT increases from the active area ACT to the black matrix BM, thereby making it possible to view an image in front of the black matrix BM, on which an image is not actually displayed.

Further, as shown in the enlarged view in FIG. 4, from the active area ACT to the black matrix BM, the heights of the peaks Pma to Pmn may be constant, and the heights of the valleys Pva to Pvn may gradually decrease such that an imaginary extension line, which connects the valleys Pva to Pvn, forms an aspheric curve CUR.

That is, the heights of the valleys Pva to Pvn may decrease in a nonlinear manner from the active area ACT to the black matrix BM. Specifically, the degree of variation in the heights of the valleys Pva to Pvn may gradually increase from the active area ACT to the black matrix BM.

As such, since the degree of variation in the heights of the valleys Pva to Pvn gradually increases from the active area ACT to the black matrix BM, that is, since the heights of the valleys Pva to Pvn decrease in a nonlinear manner, the refractive index generated by the Fresnel pattern 311 may vary in a nonlinear manner from the active area ACT to the black matrix BM.

Specifically, the refractive index generated by the Fresnel pattern 311 may increase from the active area ACT to the black matrix BM, which makes it possible to view an image in front of the black matrix BM.

In addition, it is also possible to view an image in front of the bezel CS disposed around the black matrix BM, thereby exhibiting the same effect as minimizing the size of the bezel.

In particular, there is an advantage in that the thickness of the optical sheet 300 is reduced using a plurality of Fresnel patterns without an additional optical lens being provided around the optical sheet 300 or the bezel.

Meanwhile, as shown in FIG. 4, a pattern portion 310, at which the Fresnel pattern 311 is formed, may have a width B that is greater than the width WBM of the black matrix BM.

As shown in FIG. 4, owing to the Fresnel pattern 311, which is formed at an end portion of the optical sheet 300, and more specifically, which is formed on a portion of the active area ACT as well as on the black matrix BM, the light output from the active area ACT is further refracted toward the black matrix BM through the Fresnel pattern 311.

Accordingly, it is possible to view an image in front of the black matrix BM, on which an image is not actually displayed. Further, it is also possible to view an image in front of the bezel CS disposed around the black matrix BM, thereby exhibiting the same effect as minimizing the size of the bezel.

The optical sheet 300 may include a base portion 320, and a pattern portion 310, which is disposed on the base portion 320 and at which the Fresnel pattern 311 is formed.

In the drawings, it is illustrated by way of example that the base portion 320 is attached onto the active area ACT and the black matrix BM of the display 180 and that the pattern portion 310 is disposed on the base portion 320.

Specifically, it is illustrated that the pattern portion 310 is disposed on the black matrix BM and on a portion of the active area ACT.

Meanwhile, the Fresnel pattern 311, as shown in FIG. 4, may be formed in an engraving manner. Since the Fresnel pattern 311 is formed in the manner of being engraved into a predetermined region along the height of the optical sheet 300, abrasion of the Fresnel pattern 311 may be reduced.

Meanwhile, the base portion 320 may include silicon and may have a refractive index of about 1.42.

The refractive index of the Fresnel pattern 311 may be higher than that of the base portion 320, and may preferably range from about 1.5 to about 1.8.

The base portion 320 may have a height A ranging from 1 to 5 mm.

The height A of the base portion 320 may be greater than the width B of the pattern portion 310.

For example, in the case in which the width B of the pattern portion 310 is large enough to cover the black matrix BM and a relatively large portion of the active area ACT, a greater part of the light output from the active area ACT is refracted toward the black matrix BM by the pattern portion 310, making it possible to view an image in front of the black matrix BM, but degrading the brightness or resolution of the image.

Accordingly, the width B of the pattern portion 310 may preferably be greater than that of the black matrix BM, and may more preferably be smaller than the height A of the base portion 320.

In the case in which the width B of the pattern portion 310 is smaller than the height A of the base portion 320, that is, in which the height A of the base portion 320 is greater than the width B of the pattern portion 310, it is possible to view an image in front of the black matrix BM and to enable the brightness or resolution of the image to be maintained at a favorable level.

In other words, the present invention is characterized in that it enables the user to view an image in front of the black matrix BM while maintaining the brightness or resolution of the image at a favorable level.

Meanwhile, the height A of the base portion 320 may more preferably be greater than the width WBM of the black matrix BM.

As described above, since it is desirable that the height A of the base portion 320 be greater than the width B of the pattern portion 310, in order to make it possible to view an image in front of the black matrix BM and also to maintain the brightness or resolution of the image at a favorable level, it is more desirable that the height A of the base portion 320 be greater than the width WBM of the black matrix BM.

As shown in FIGS. 3 and 4, owing to the pattern portion 310 of the optical sheet 300, it is possible to view an image in front of the bezel CS, which is formed along the sides of the optical sheet 300 and the sides of the black matrix BM.

Figure 5A:
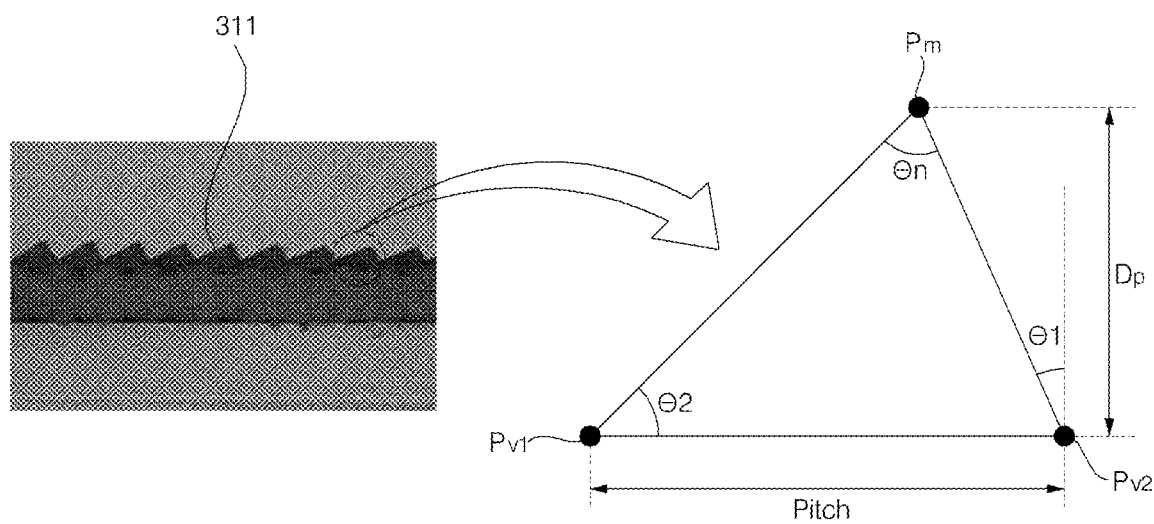
FIG. 5A is a view illustrating one unit of a Fresnel pattern shown in FIG. 4.
Figure 5B:
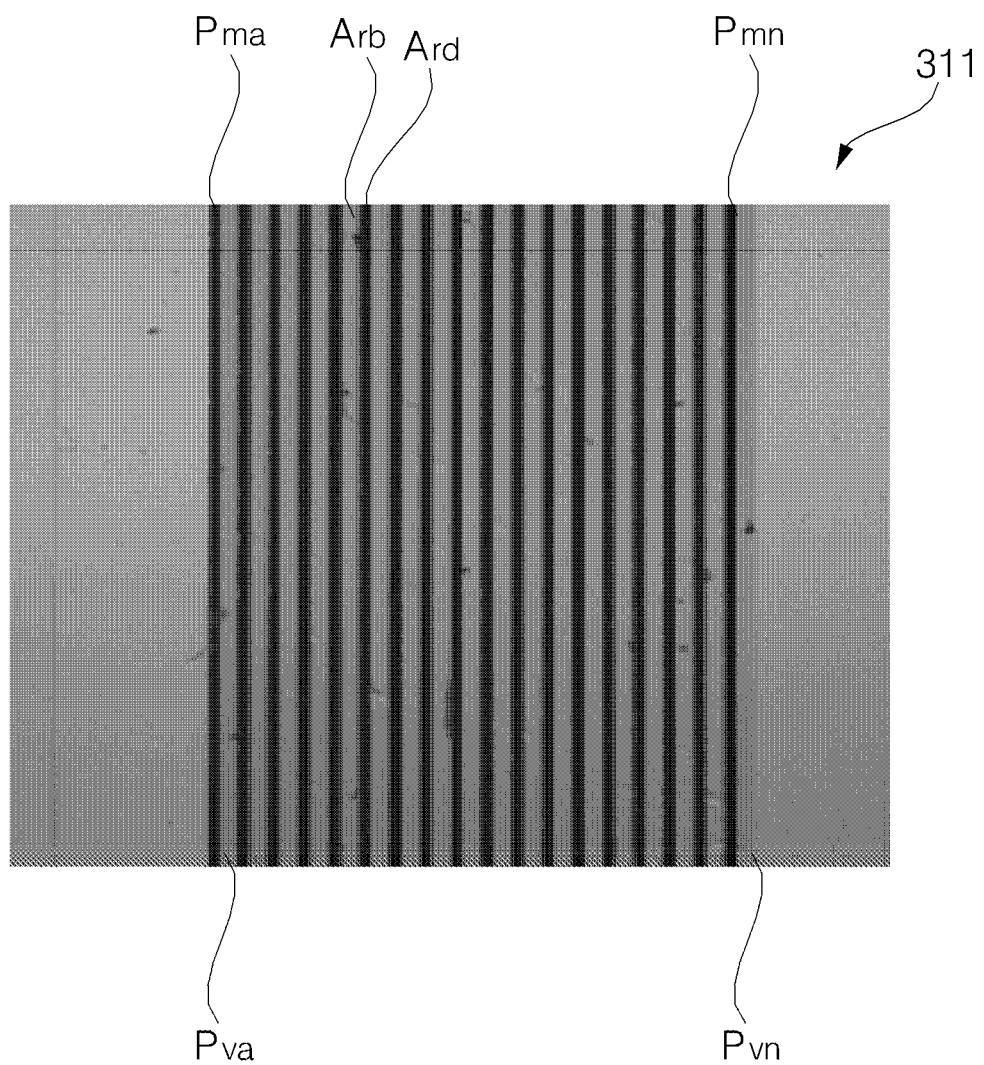
FIG. 5B is a top view of the Fresnel pattern shown in FIG. 4.

FIG. 5A is a view illustrating one unit of the Fresnel pattern shown in FIG. 4, and FIG. 5B is a top view of the Fresnel pattern shown in FIG. 4.

First, referring to FIG. 5A, one unit of the Fresnel pattern 311 may include a peak Pm and valleys Pv1 and Pv2.

The distance between the valley Pv1 and the valley Pv2 may be defined as a pitch, the angle between the valley Pv2 and the vertical line may be defined as a draft angle θ1, the angle between the valley Pv1 and the horizontal line may be defined as a Fresnel angle θ2, and the interior angle of the peak Pm may be defined as an angle θ3 of the peak. The Fresnel pattern 311 may include a plurality of peaks Pma to Pmn and a plurality of valleys Pva to Pvn, and the angles θ3 of the peaks Pma to Pmn may gradually decrease from the active area ACT to the black matrix BM.

In the case in which the angles θ3 of the peaks Pma to Pmn decrease from the active area ACT to the black matrix BM, the light output from the active area ACT is refracted toward the black matrix BM by the Fresnel pattern 311, making it possible to view an image in front of the black matrix BM.

According to FIG. 5B, bright areas Arb and dark areas Ard are present, which are distinguished from each other by the Fresnel pattern 311. It is illustrated in the drawing that the widths of the bright areas Arb are greater than those of the dark areas Ard.

Among the parameters of the Fresnel pattern 311, which are defined in FIG. 5A, in the case in which the pitch gradually increases from the active area ACT to the black matrix BM, the dark areas Ard shown in FIG. 5B are reduced, and accordingly, the user is more capable of viewing an image in front of the black matrix BM. That is, the user may perceive the width of the black matrix BM to be smaller than the actual width thereof, and further, may perceive the width of the bezel to be smaller than the actual width thereof.

Meanwhile, among the parameters of the Fresnel pattern 311, which are defined in FIG. 5A, in the case in which the draft angle θ1 gradually increases from the active area ACT to the black matrix BM, the dark areas Ard shown in FIG. 5B are reduced, and accordingly, the user is more capable of viewing an image in front of the black matrix BM. That is, the user may perceive the width of the black matrix BM to be smaller than the actual width thereof, and further, may perceive the width of the bezel to be smaller than the actual width thereof.

Figure 6:
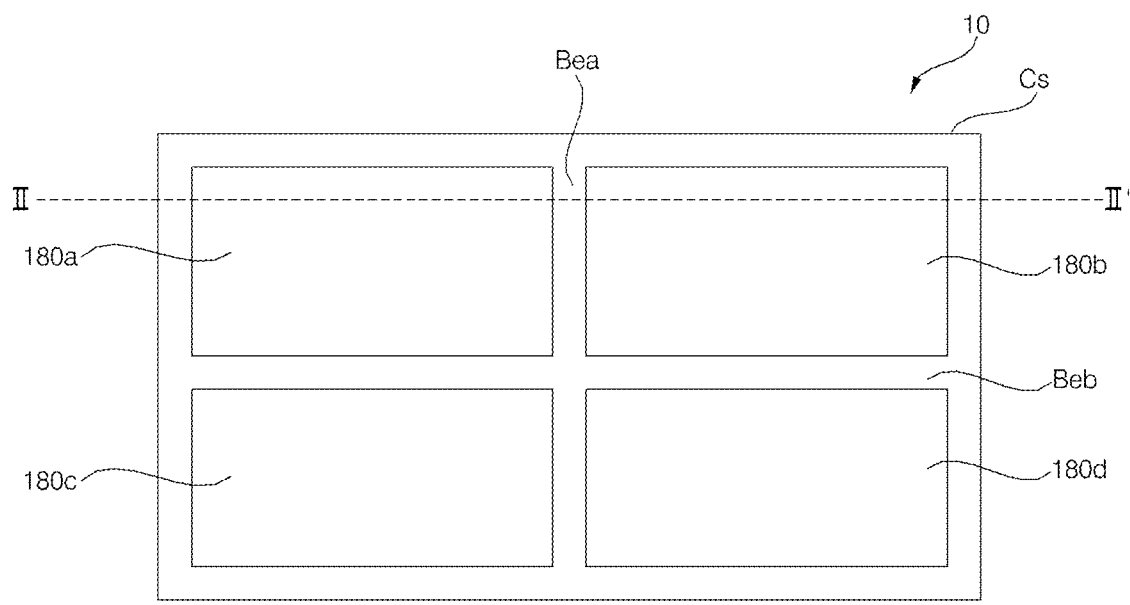
FIG. 6 is a view illustrating the external appearance of a display apparatus according to another embodiment of the present invention.

FIG. 6 is a view illustrating the external appearance of a display apparatus according to another embodiment of the present invention, and FIG. 7 is a sectional view taken along line II-II' in FIG. 6.

Referring to the drawings, a display apparatus 10 shown in FIG. 6 may include a plurality of displays 180a to 180d, bezels Bea and Beb disposed between the displays 180a to 180d, and a bezel CS disposed around the displays 180a to 180d.

Figure 7A:
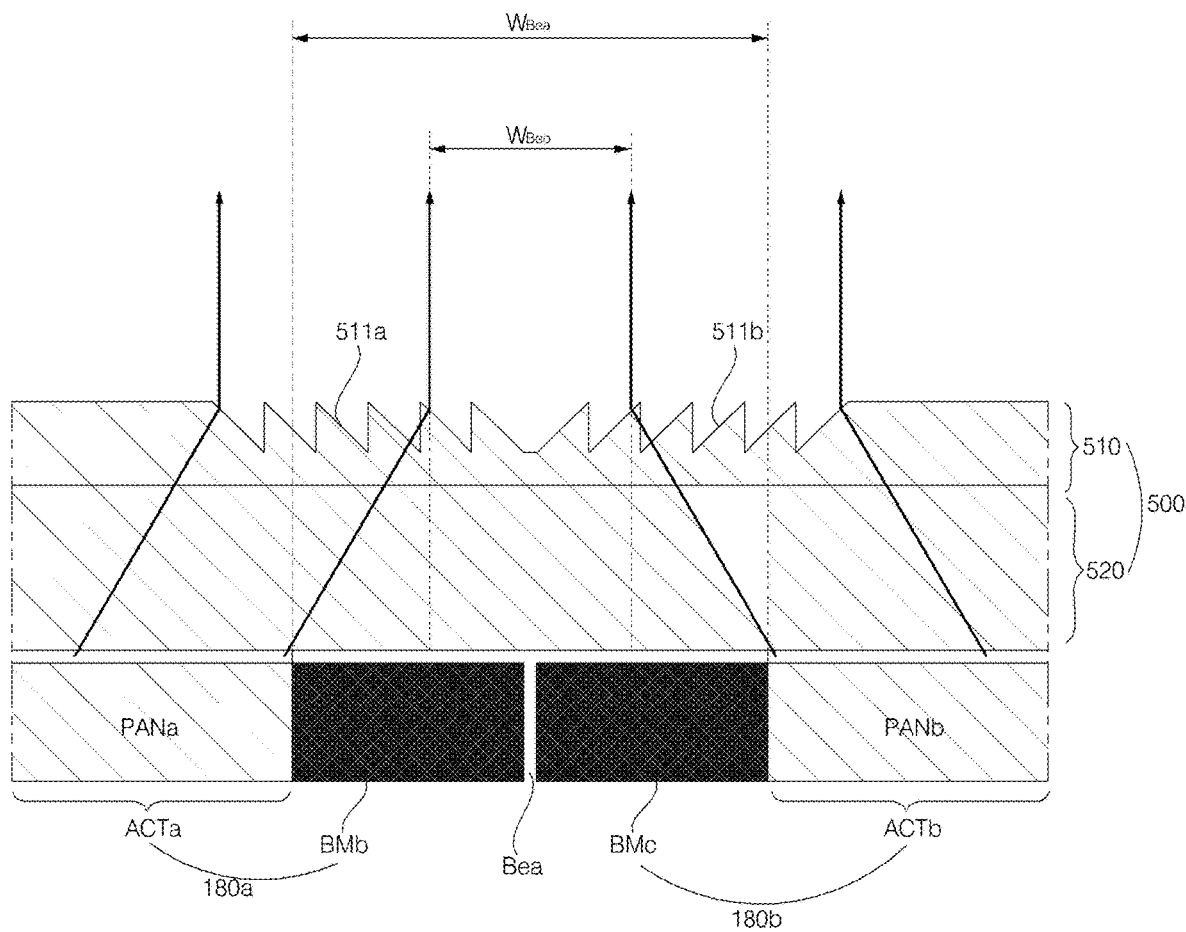
FIGS. 7A and 7B are exemplary sectional views taken along line II-II' in FIG. 6.
Figure 7B:
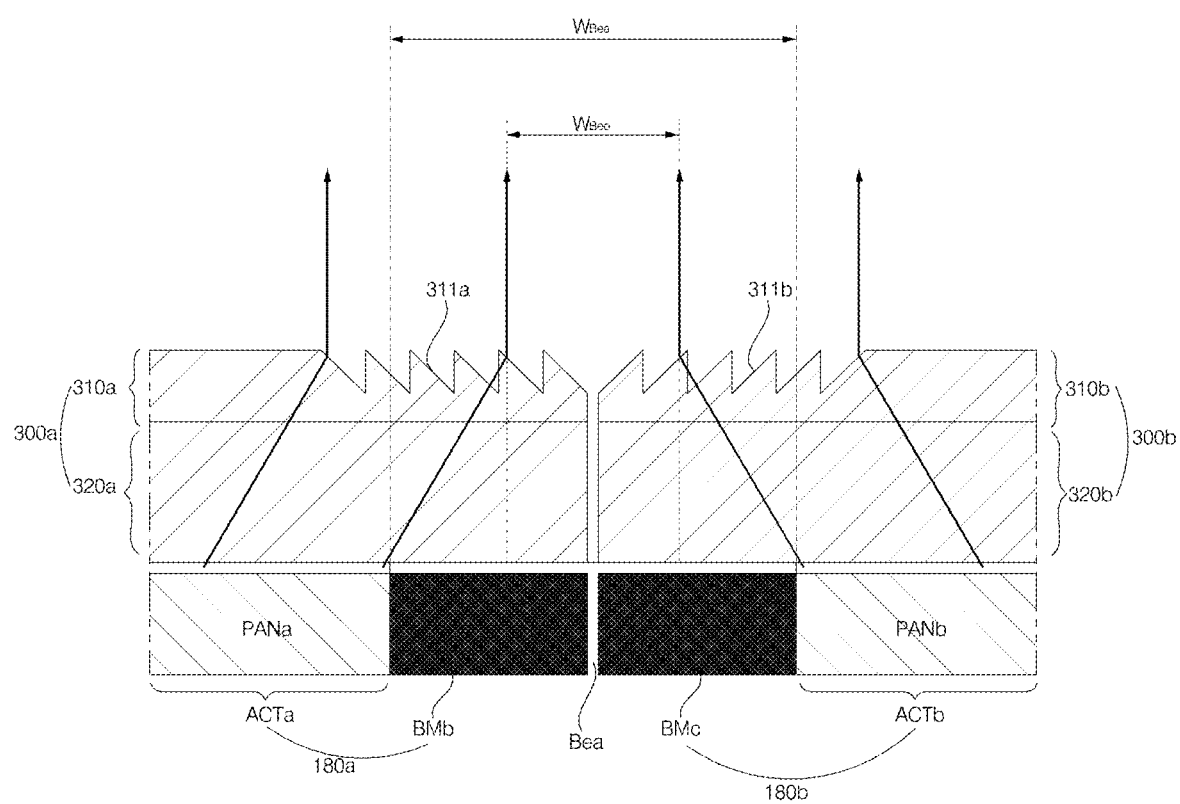

Among the displays 180a to 180d, first and second displays 180a and 180b, as shown in FIG. 7A or 7B, may include active areas ACTa and ACTb, which correspond to panels on which an image is displayed, and black matrices BMa, BMb, BMc and BMd, which are arranged at the left and right sides of the active areas ACTa and ACTb.

The display apparatus 10, as shown in FIG. 7A, may further include an optical sheet 500, which is disposed on the active areas ACTa and ACTb and the black matrices BMa, BMb, BMc and BMd.

The optical sheet 500 may extend onto the bezel Bea, which is disposed between the first display 180a and the second display 180b.

The bezel CS may be formed along the sides of the optical sheet 500 and the sides of the black matrices BMa and BMd.

According to the structure shown in FIG. 7A, the optical sheet 500 may include a base portion 520, which is attached onto the active areas ACTa and ACTb and the black matrices BMa, BMb, BMc and BMd, and a pattern portion 510, which is disposed on the base portion 520 and at which a plurality of Fresnel patterns 511a and 511b is formed.

The Fresnel patterns 511a and 511b may be formed symmetrically with each other about the bezel Bea.

The structure of each of the Fresnel patterns 511a and 511b is the same as described above with reference to FIGS. 3 to 5B.

That is, each of the Fresnel patterns 511a and 511b includes a plurality of peaks Pma to Pmn and a plurality of valleys Pva to Pvn. The depths Dpa to Dpn between the peaks and the valleys may gradually increase from the active area ACT to the black matrix BM.

It is desirable that the width B of the pattern portion 510, at which the Fresnel patterns 511a and 511b are formed, be greater than the widths of the black matrices disposed within the Fresnel patterns 511a and 511b.

An imaginary extension line, which connects the valleys Pva to Pvn of each of the Fresnel patterns 511a and 511b, may form an aspheric curve.

It is desirable that the height A of the base portion 520 be greater than the width B of the pattern portion 510 of the optical sheet 500. It is more desirable that the height A of the base portion 520 be greater than the width of the black matrix.

Each of the Fresnel patterns 511a and 511b includes a plurality of peaks Pma to Pmn and a plurality of valleys Pva to Pvn, and it is desirable for the angles of the peaks Pma to Pmn to gradually decrease from the active area ACT to the black matrix.

Meanwhile, according to the structure shown in FIG. 7A, a single optical sheet 500 is disposed on the entirety of the surfaces of the displays 180a to 180d, and it is possible to view an image in front of the black matrix owing to the Fresnel patterns formed at the optical sheet. Accordingly, the user is incapable of perceiving an image only within the range corresponding to the width Wbeo, which is smaller than the width Wbea, within which an image is not actually displayed.

That is, the user may perceive the width of the black matrix to be smaller than the actual width thereof, and further, may perceive the width of the bezel to be smaller than the actual width thereof. Therefore, the immersion level with respect to the image displayed on the displays 180a to 180d is enhanced.

Meanwhile, different from the structure shown in FIG. 7A, FIG. 7B illustrates a structure in which a first optical sheet 300a is attached onto the first display 180a and a second optical sheet 300b is attached onto the second display 180b.

That is, this structure is characterized in that no optical sheet is attached onto the bezel Bea between the first display 180a and the second display 180b.

The first and second optical sheets 300a and 300b are the same as the optical sheet 300 described above with reference to FIGS. 3 to 5b, and thus an explanation thereof will be omitted.

Figure 8A:
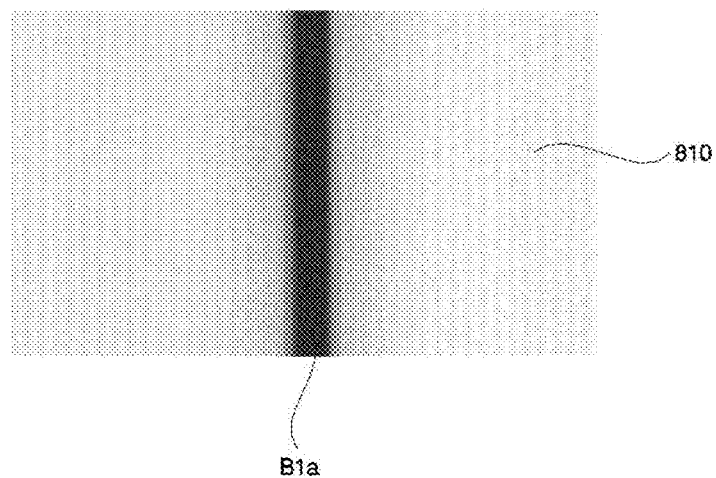
FIGS. 8A and 8B are views illustrating examples of images displayed by optical sheets shown in FIG. 7A or 7B.
Figure 8B:
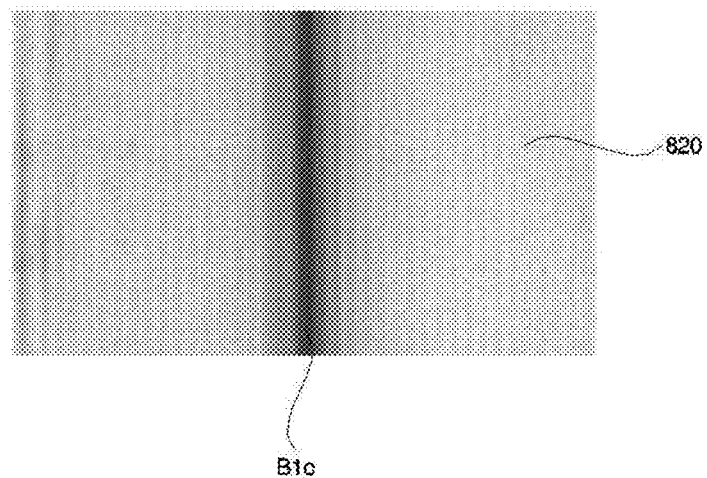

FIGS. 8A and 8B are views illustrating examples of images displayed by the optical sheets shown in FIG. 7A or 7B.

FIG. 8A is a view illustrating an image 810, which is perceived in front of the bezel Bea when the displays 180a and 180b display a white image in the display apparatus 10b, to which the optical sheets 210a and 210b shown in FIG. 2B are attached.

A region Bla within the image 810 is the region that corresponds to the bezel Bea, from which it can be seen that a dark area having a relatively large width is displayed.

FIG. 8B is a view illustrating an image 820, which is perceived in front of the bezel Bea when the displays 180a and 180b display a white image in the display apparatus 10, to which the optical sheet 500 shown in FIG. 7A and the optical sheets 300a and 300b shown in FIG. 7B are attached.

A region Blc within the image 820 is the region that corresponds to the bezel Bea, from which it can be seen that the width of a dark area decreases and is thus smaller than that in FIG. 8A, and that the dark area has gradation and is therefore relatively less dark.

As such, owing to the optical sheet 500 shown in FIG. 7A or the optical sheets 300a and 300b shown in FIG. 7B, it is possible to view an image output from the active area even in front of the black matrix or the bezel. As a result, the user perceives the bezel to be smaller than the actual size thereof.

Figure 9:
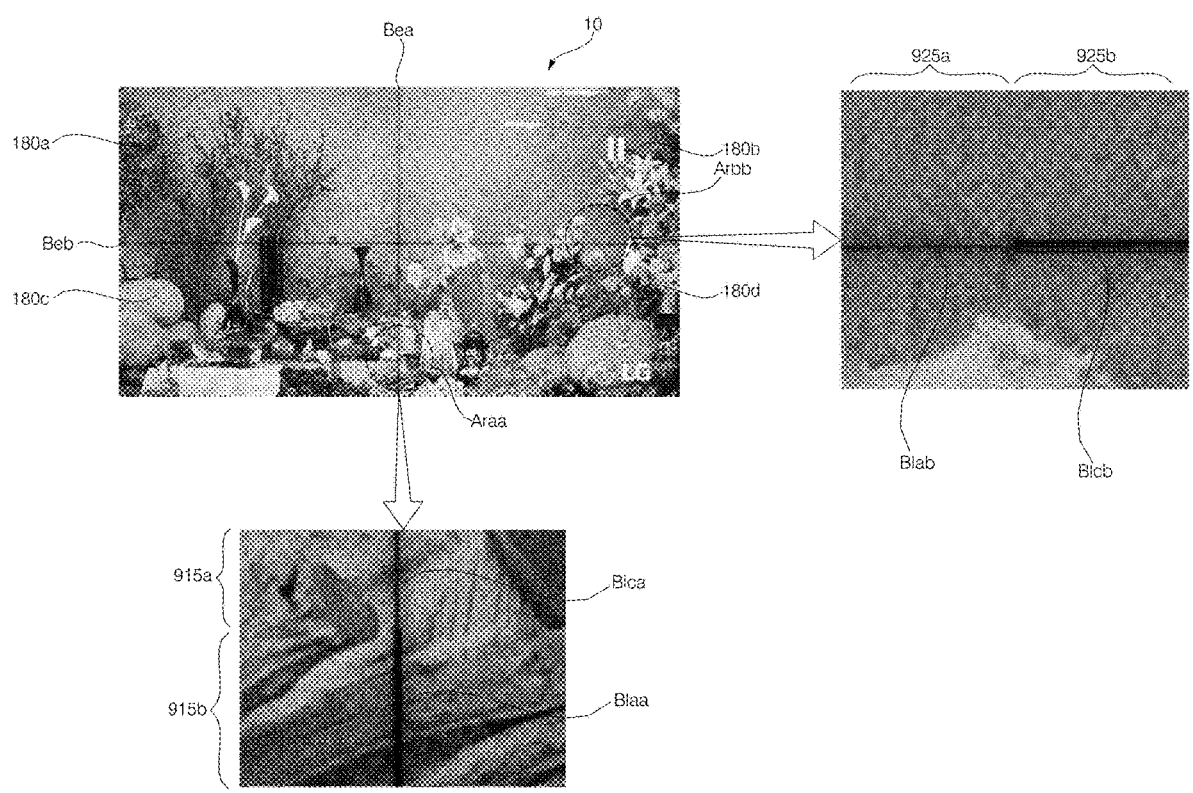
FIG. 9 is a view illustrating another example of an image displayed by the optical sheets shown in FIG. 7A or 7B.

FIG. 9 is a view illustrating another example of an image displayed by the optical sheets shown in FIG. 7A or 7B.

FIG. 9 illustrates an image 910 displayed on the display apparatus 10, which includes the displays 180a to 180d.

The display apparatus 10 shown in FIG. 9 may be placed in various places, and more particularly, in the case in which the display apparatus 10 is mounted to a wall, it may be referred to as a video wall display system.

In the case in which the optical sheets 210a and 210b shown in FIG. 2B are applied to a region Araa, which is the boundary region between the third display 180c and the fourth display 180*d*, the user views an image 915*b*, which has a dark area Blaa, the width of which is the same as the actual width of the bezel Bea.

On the other hand, in the case in which the optical sheet 500 shown in FIG. 7A or the optical sheets 300*a* and 300*b* shown in FIG. 7B are applied to the region Araa, the user views an image 915*a*, which has a dark area Blca, the width of which is smaller than the actual width of the bezel Bea. Accordingly, the user perceives the bezel to be smaller than the actual size thereof.

Meanwhile, in the case in which the optical sheets 210*a* and 210*b* shown in FIG. 2B are applied to a region Arbb, which is the boundary region between the second display 180*b* and the fourth display 180*d*, the user views an image 925*b*, which has a dark area Blcb, the width of which is the same as the actual width of the bezel Beb.

On the other hand, in the case in which the optical sheet 500 shown in FIG. 7A or the optical sheets 300*a* and 300*b* shown in FIG. 7B are applied to the region Arbb, the user views an image 925*a*, which has a dark area Blab, the width of which is smaller than the actual width of the bezel Beb. Accordingly, the user perceives the bezel to be smaller than the actual size thereof.

Figure 10:
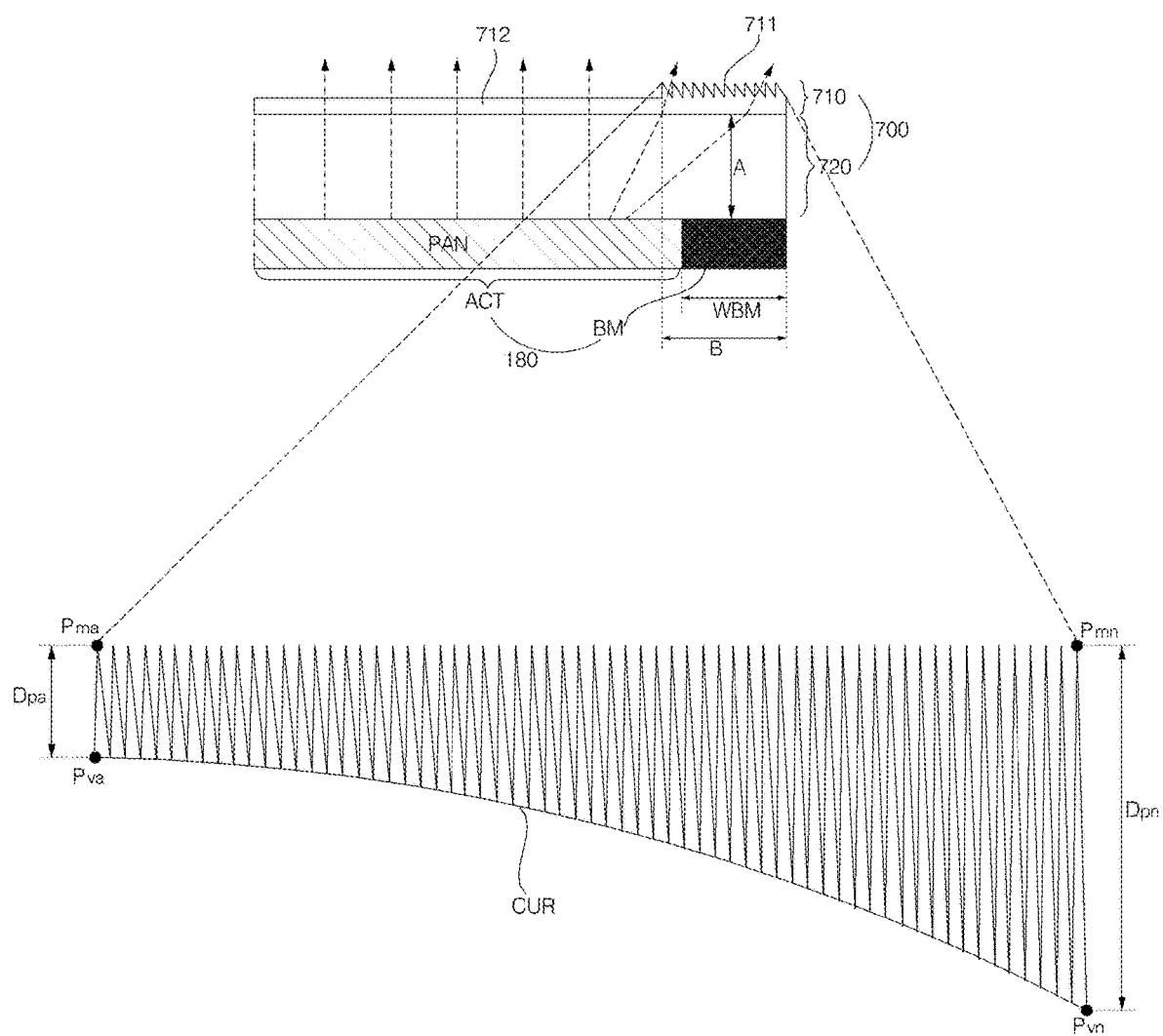
FIG. 10 is a sectional view of an optical sheet according to a further embodiment of the present invention.

FIG. 10 is a sectional view of an optical sheet according to a further embodiment of the present invention.

Referring to the drawing, an optical sheet 700 in FIG. 10 has a structure similar to that of the optical sheet 300 in FIG. 4. However, the optical sheet 700 has a difference in that a Fresnel pattern 711 is formed at the optical sheet 700 in an embossing manner.

Accordingly, different from the structure shown in FIG. 4, a pattern portion 710, on which the Fresnel pattern 711 is formed, has a height greater than that of a portion 712 of the active area on which the Fresnel pattern 711 is not formed.

Meanwhile, similar to the structure in FIG. 4, the optical sheet 700 includes a Fresnel pattern 711, which is formed on the black matrix BM and a portion of the active area ACT. The Fresnel pattern 711 includes a plurality of peaks Pma to Pmn and a plurality of valleys Pva to Pvn. The depths Dpa to Dpn between the peaks and the valleys gradually increase from the active area ACT to the black matrix BM.

Specifically, as shown in the enlarged view in FIG. 10, from the active area ACT to the black matrix BM, the heights of the peaks Pma to Pmn are constant, and the heights of the valleys Pva to Pvn gradually decrease, with the result that the depths Dpa to Dpn between the peaks and the valleys increase.

As such, since the depths Dpa to Dpn between the peaks and the valleys in the Fresnel pattern 711 gradually increase from the active area ACT to the black matrix BM, the degree of refraction of light output from the active area ACT increases from the active area ACT to the black matrix BM, thereby making it possible to view an image in front of the black matrix BM, on which an image is not actually displayed.

Further, as shown in the enlarged view in FIG. 10, from the active area ACT to the black matrix BM, the heights of the peaks Pma to Pmn may be constant, and the heights of the valleys Pva to Pvn may gradually decrease such that an imaginary extension line, which connects the valleys Pva to Pvn, forms an aspheric curve.

That is, the heights of the valleys Pva to Pvn may decrease in a nonlinear manner from the active area ACT to the black matrix BM. Specifically, the degree of variation in the heights of the valleys Pva to Pvn may gradually increase from the active area ACT to the black matrix BM.

As such, since the degree of variation in the heights of the valleys Pva to Pvn gradually increases from the active area ACT to the black matrix BM, that is, since the heights of the valleys Pva to Pvn decrease in a nonlinear manner, the refractive index generated by the Fresnel pattern 711 may vary in a nonlinear manner from the active area ACT to the black matrix BM.

Specifically, the refractive index generated by the Fresnel pattern 711 may increase from the active area ACT to the black matrix BM, which makes it possible to view an image in front of the black matrix BM.

In addition, it is also possible to view an image in front of the bezel CS disposed around the black matrix BM, thereby exhibiting the same effect as minimizing the size of the bezel.

In particular, there is an advantage in that the thickness of the optical sheet 700 is reduced using a plurality of Fresnel patterns without an additional optical lens being provided around the optical sheet 700 or the bezel.

Meanwhile, as shown in FIG. 10, a pattern portion 710, at which the Fresnel pattern 711 is formed, may have a width B that is greater than the width WBM of the black matrix BM.

The optical sheet 700 may include a base portion 720, and a pattern portion 710, which is disposed on the base portion 720 and at which the Fresnel pattern 711 is formed.

The height A of the base portion 720 may preferably be greater than the width B of the pattern portion 710.

The width B of the pattern portion 710 may preferably be greater than that of the black matrix BM, and may more preferably be smaller than the height A of the base portion 720.

The height A of the base portion 720 may more preferably be greater than the width WBM of the black matrix BM.

As shown in FIG. 10, owing to the pattern portion 710 of the optical sheet 700, it is possible to view an image in front of the bezel CS, which is formed along the sides of the optical sheet 700 and the sides of the black matrix BM.

Figure 11:
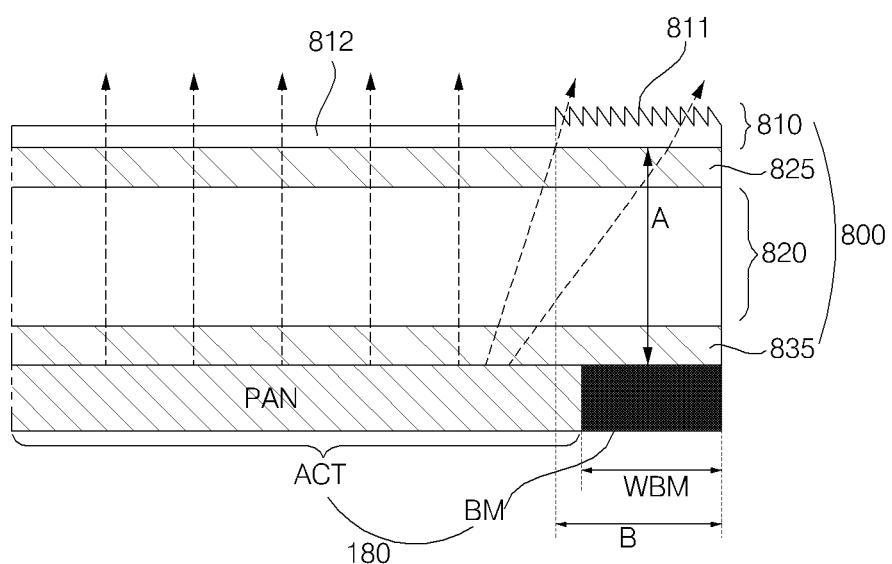
FIG. 11 is a sectional view of an optical sheet according to a further embodiment of the present invention.

FIG. 11 is a sectional view of an optical sheet according to a further embodiment of the present invention.

Referring to the drawing, an optical sheet 800 in FIG. 11 has a structure similar to that of the optical sheet 300 in FIG. 4. However, the optical sheet 800 has a difference in that it further includes colorless optically clear adhesive (OCA) layers.

The optical sheet 800 may include a first OCA layer 835, which is attached onto the display 180, a base portion 820, which is disposed on the first OCA layer 835, a second OCA layer 825, which is disposed on the base portion 820, and a pattern portion 810, which is disposed on the second OCA layer 825 and at which a Fresnel pattern 811 is formed.

The first OCA layer 835 and the second OCA layer 825 enable the display 180, the base portion 820 and the pattern portion 810 to be stably adhered to one another.

Figure 12:
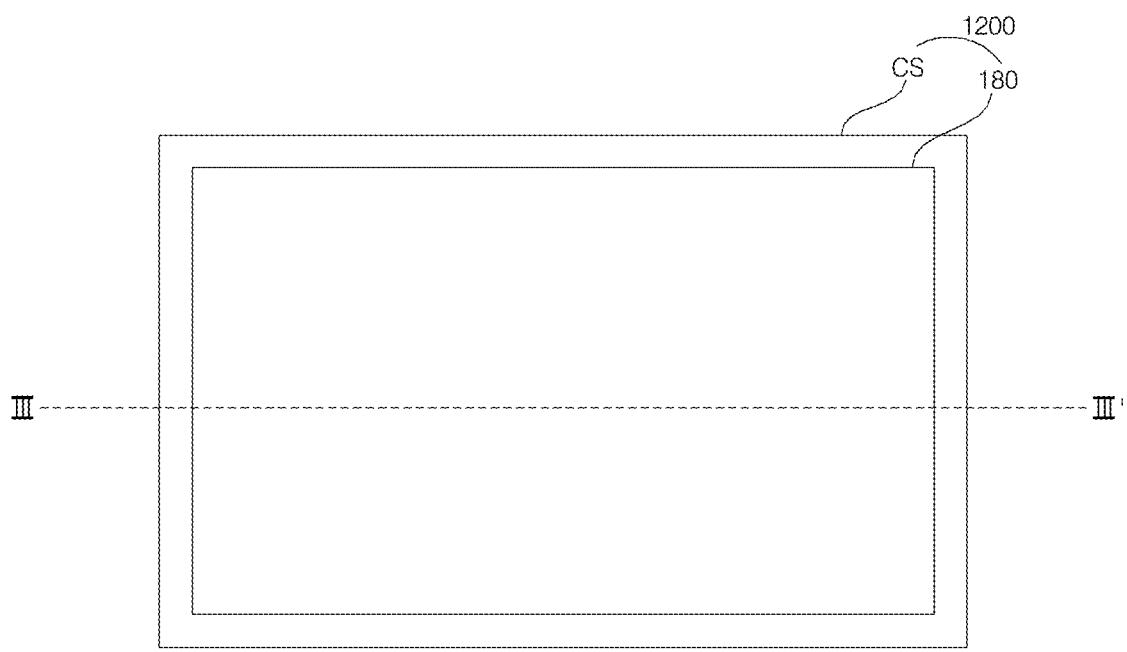
FIG. 12 is a view illustrating the external appearance of a display apparatus according to a further embodiment of the present invention.
Figure 13:
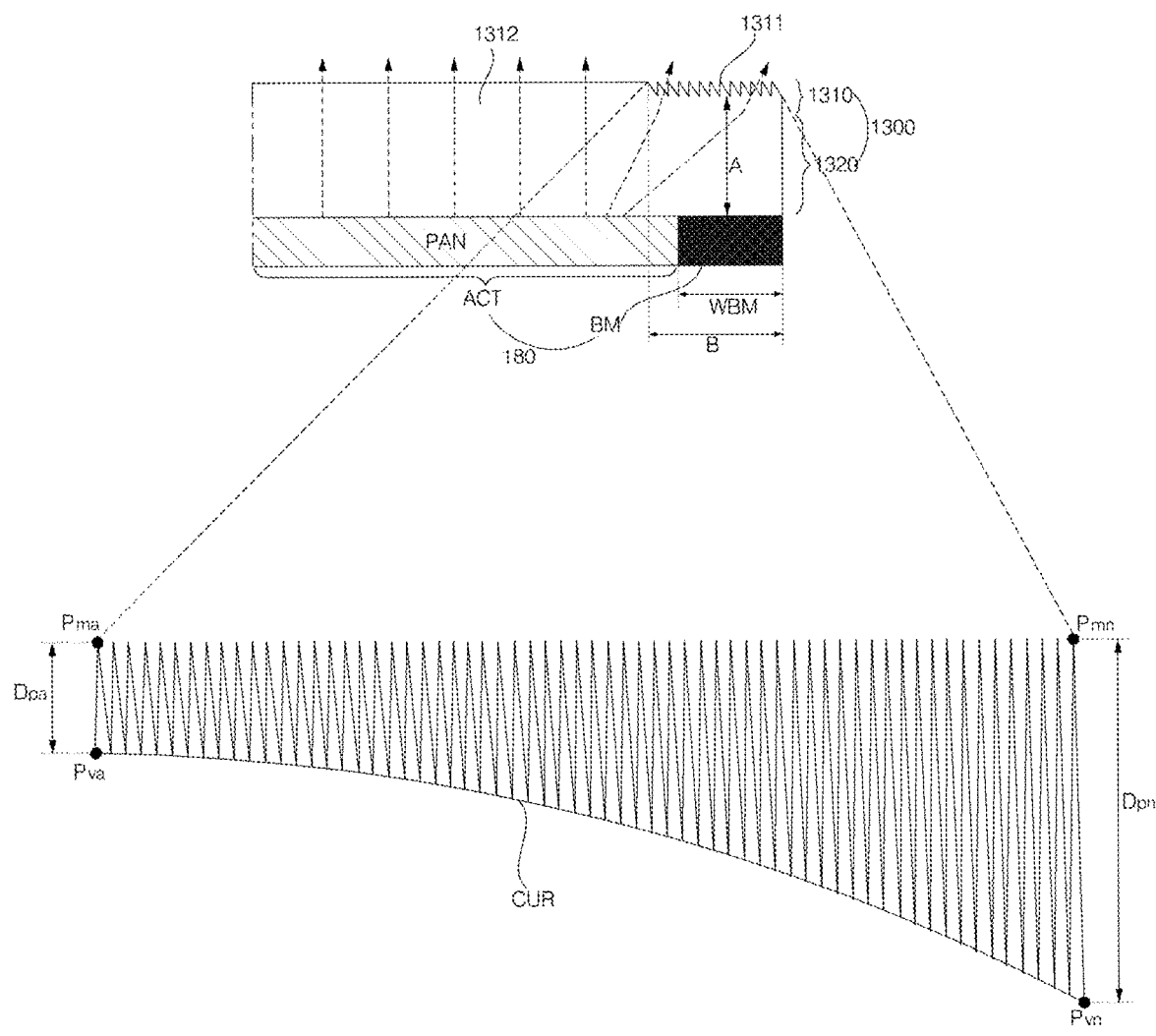
FIG. 13 is a sectional view taken along line III-III' in FIG. 12.

FIG. 12 is a view illustrating the external appearance of a display apparatus according to a further embodiment of the present invention, and FIG. 13 is a sectional view taken along line III-III' in FIG. 12.

Referring to the drawings, a display apparatus 1200 in FIG. 12 may include a display 180 and a bezel CS disposed around the display 180.

The display 180, as shown in FIG. 13, may include an active area ACT, which corresponds to a panel PAN, on which an image is displayed, and a black matrix BM, which is arranged at each of the left and right sides of the active area ACT.

The display apparatus 1200 may further include a glass substrate 1300, which is disposed on the active area ACT and the black matrix BM of the display 180.

The glass substrate 1300 according to one embodiment of the present invention includes a Fresnel pattern 1311, which is formed on the black matrix BM and a portion of the active area ACT. The Fresnel pattern 1311 includes a plurality of peaks Pma to Pmn and a plurality of valleys Pva to Pvn. The depths Dpa to Dpn between the peaks and the valleys gradually increase from the active area ACT to the black matrix BM.

Specifically, as shown in the enlarged view in FIG. 13, from the active area ACT to the black matrix BM, the heights of the peaks Pma to Pmn are constant, and the heights of the valleys Pva to Pvn gradually decrease, with the result that the depths Dpa to Dpn between the peaks and the valleys increase.

As such, since the depths Dpa to Dpn between the peaks and the valleys in the Fresnel pattern 1311 gradually increase from the active area ACT to the black matrix BM, the degree of refraction of light output from the active area ACT increases from the active area ACT to the black matrix BM, thereby making it possible to view an image in front of the black matrix BM, on which an image is not actually displayed.

Further, as shown in the enlarged view in FIG. 13, from the active area ACT to the black matrix BM, the heights of the peaks Pma to Pmn may be constant, and the heights of the valleys Pva to Pvn may gradually decrease such that an imaginary extension line, which connects the valleys Pva to Pvn, forms an aspheric curve.

That is, the heights of the valleys Pva to Pvn may decrease in a nonlinear manner from the active area ACT to the black matrix BM. Specifically, the degree of variation in the heights of the valleys Pva to Pvn may gradually increase from the active area ACT to the black matrix BM.

As such, since the degree of variation in the heights of the valleys Pva to Pvn gradually increases from the active area ACT to the black matrix BM, that is, since the heights of the valleys Pva to Pvn decrease in a nonlinear manner, the refractive index generated by the Fresnel pattern 1311 may vary in a nonlinear manner from the active area ACT to the black matrix BM.

Specifically, the refractive index generated by the Fresnel pattern 1311 may increase from the active area ACT to the black matrix BM, which makes it possible to view an image in front of the black matrix BM.

In addition, it is also possible to view an image in front of the bezel CS disposed around the black matrix BM, thereby exhibiting the same effect as minimizing the size of the bezel.

In particular, there is an advantage in that the thickness of the glass substrate 1300 is reduced using a plurality of Fresnel patterns without an additional optical lens being provided around the glass substrate 1300 or the bezel.

Meanwhile, as shown in FIG. 13, a pattern portion 1310, at which the Fresnel pattern 1311 is formed, may have a width B that is greater than the width WBM of the black matrix BM.

As shown in FIG. 13, owing to the pattern portion 1310 of the optical sheet 1300, it is possible to view an image in front of the bezel CS, which is formed along the sides of the glass substrate 1300 and the sides of the black matrix BM.

Figure 14:
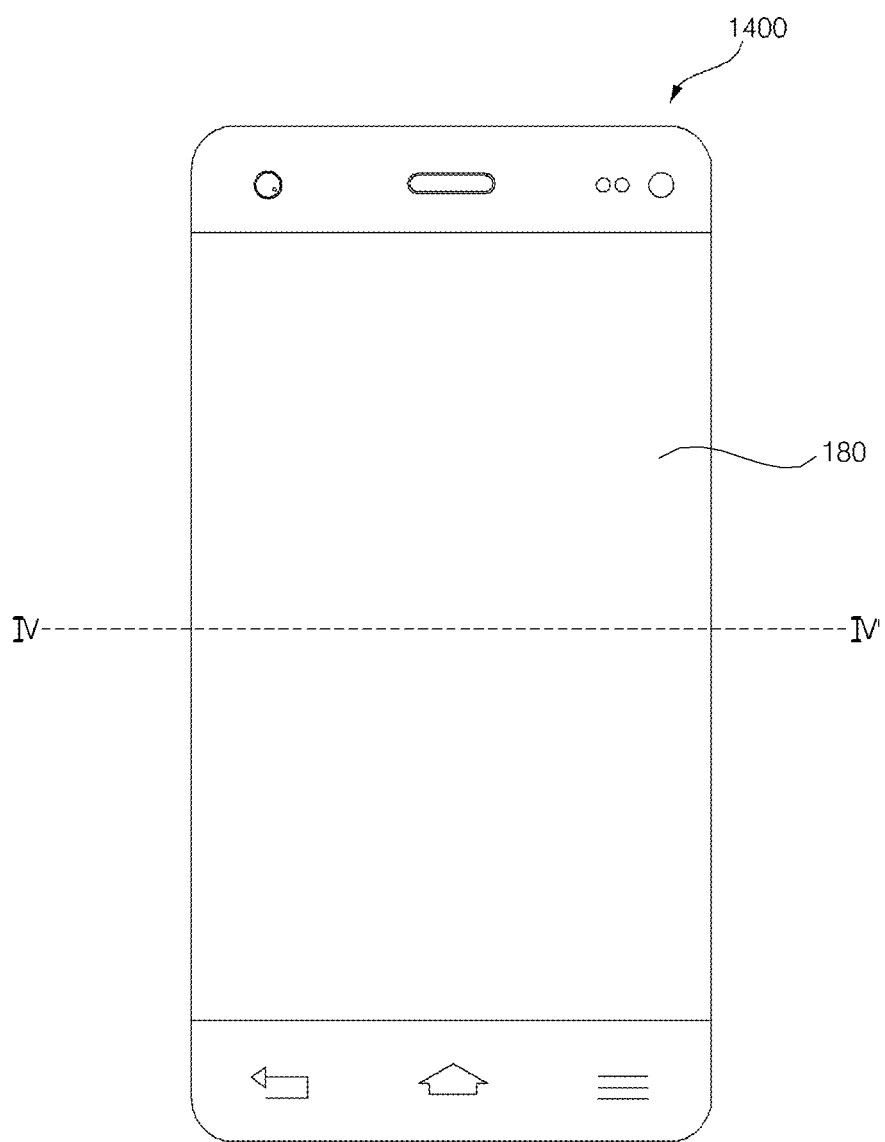
FIG. 14 is a view illustrating the external appearance of a display apparatus according to a further embodiment of the present invention.
Figure 15:
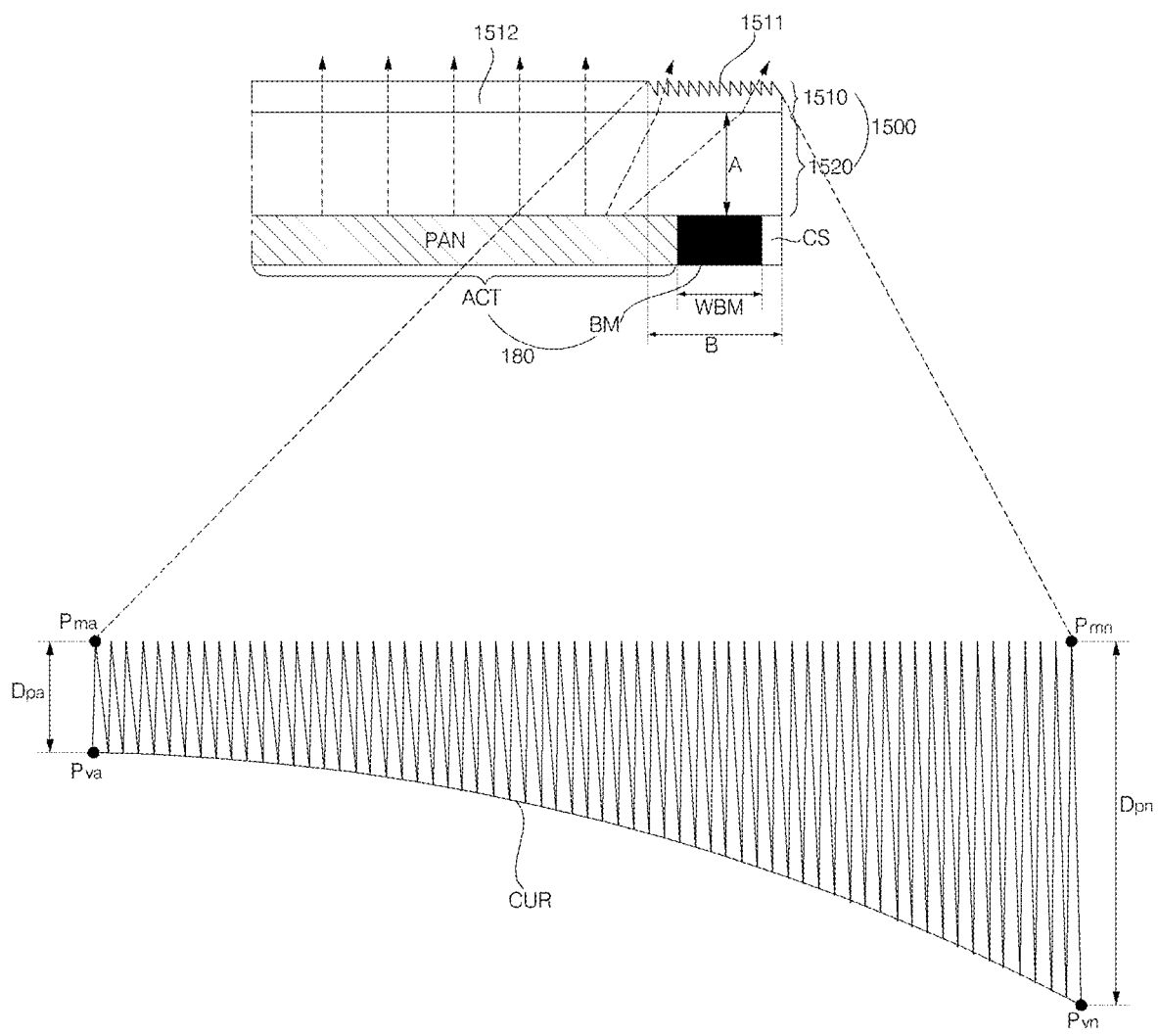
FIG. 15 is a sectional view taken along line IV-IV' in FIG. 14.

FIG. 14 is a view illustrating the external appearance of a display apparatus according to a further embodiment of the present invention, and FIG. 15 is a sectional view taken along line IV-IV' in FIG. 14.

Referring to the drawings, a display apparatus 1400 in FIG. 14 may include a display 180 and a bezel CS disposed around the display 180.

The display 180, as shown in FIG. 15, may include an active area ACT, which corresponds to a panel PAN, on which an image is displayed, and a black matrix BM, which is arranged at each of the left and right sides of the active area ACT.

In particular, different from the structure shown in FIG. 4, the bezel CS, as shown in FIG. 15, may be formed along the side of the black matrix BM.

Accordingly, different from the structure shown in FIG. 4, the optical sheet 1500 may be attached onto the bezel CS, the black matrix BM and the active area ACT.

The display apparatus 1400, which includes the optical sheet 1500, which is attached onto the bezel CS, the black matrix BM and the active area ACT, may be a mobile terminal such as a smart phone.

Meanwhile, the optical sheet 1500 shown in FIG. 15 includes a Fresnel pattern 1511, which is formed on the black matrix BM and a portion of the active area ACT. The Fresnel pattern 1511 includes a plurality of peaks Pma to Pmn and a plurality of valleys Pva to Pvn. The depths Dpa to Dpn between the peaks and the valleys gradually increase from the active area ACT to the black matrix BM.

Specifically, as shown in the enlarged view in FIG. 15, from the active area ACT to the black matrix BM, the heights of the peaks Pma to Pmn are constant, and the heights of the valleys Pva to Pvn gradually decrease, with the result that the depths Dpa to Dpn between the peaks and the valleys increase.

As such, since the depths Dpa to Dpn between the peaks and the valleys in the Fresnel pattern 1511 gradually increase from the active area ACT to the black matrix BM, the degree of refraction of light output from the active area ACT increases from the active area ACT to the black matrix BM, thereby making it possible to view an image in front of the black matrix BM, on which an image is not actually displayed.

The contents described above with reference to FIGS. 4 to 5B may be identically applied to the characteristics of the optical sheet 1500 in FIG. 15.

As is apparent from the above description, a display apparatus according to one embodiment of the present invention includes a display including an active area for displaying an image and a black matrix adjacent to the active area, and an optical sheet attached onto the display. The optical sheet includes a Fresnel pattern formed on the black matrix and a portion of the active area. The Fresnel pattern includes a plurality of peaks and a plurality of valleys, which are formed such that depths between the peaks and the valleys gradually increase from the active area to the black matrix. Accordingly, the degree of refraction of light increases from the active area to the black matrix, thereby making it possible to view an image in front of the black matrix, on which an image is not actually displayed. Further, it is also possible to view an image in front of a bezel disposed around the black matrix, thereby exhibiting the same effect as minimizing the size of the bezel.

In addition, the Fresnel pattern has the same effect as a lens, and the depths of the valleys increase from the active area to the black matrix such that an imaginary extension line connecting the valleys forms an aspheric curve. Accordingly, the refractive index of light increases, making it possible to view an image in front of the black matrix, on which an image is not actually displayed, thereby exhibiting the same effect as minimizing the size of the bezel.

The optical sheet includes a pattern portion at which the Fresnel pattern is formed, and the pattern portion has a width greater than the width of the black matrix. Accordingly, the degree of refraction of light, caused by the pattern portion, enlarges screen pixels within the action region, thereby enabling a user to perceive an image as though it were displayed on the black matrix.

The optical sheet includes a base portion, and a pattern portion, which is disposed on the base portion and at which the Fresnel pattern is formed. The base portion has a height greater than the width of the pattern portion, which reduces deterioration in the quality of the image displayed on the portion of the active area that is adjacent to the black matrix.

In addition, in the optical sheet, which includes the base portion and the pattern portion disposed on the base portion and having the Fresnel pattern, the base portion has a height greater than the width of the black matrix, which reduces deterioration in the quality of the image displayed on the portion of the active area that is adjacent to the black matrix.

Meanwhile, the peaks and the valleys of the Fresnel pattern are formed such that angles of the peaks gradually decrease from the active area to the black matrix. Accordingly, the degree of refraction of light increases, making it possible to view an image in front of the black matrix, on which an image is not actually displayed, thereby exhibiting the same effect as minimizing the size of the bezel.

A display apparatus according to another embodiment of the present invention includes a plurality of displays, each including an active area for displaying an image and a black matrix adjacent to the active area, and an optical sheet attached onto each of the displays. The optical sheet includes a Fresnel pattern formed on the black matrix and a portion of the active area. The Fresnel pattern includes a plurality of peaks and a plurality of valleys, which are formed such that depths between the peaks and the valleys gradually increase from the active area to the black matrix. Accordingly, the degree of refraction of light increases from the active area to the black matrix, thereby making it possible to view an image in front of the black matrix, on which an image is not actually displayed. Further, a user perceives the bezel disposed between the displays as being smaller than the actual size thereof. As a result, it is possible to exhibit the same effect as minimizing the size of the bezel.

A display apparatus according to a further embodiment of the present invention includes a display including an active area for displaying an image and a black matrix adjacent to the active area, and a glass substrate attached onto the display. The glass substrate includes a Fresnel pattern formed on the black matrix and a portion of the active area. The Fresnel pattern includes a plurality of peaks and a plurality of valleys, which are formed such that depths between the peaks and the valleys gradually increase from the active area to the black matrix. Accordingly, the degree of refraction of light increases from the active area to the black matrix, thereby making it possible to view an image in front of the black matrix, on which an image is not actually displayed. Further, it is possible to exhibit the same effect as minimizing the size of the bezel.

The aforementioned display apparatuses according to the embodiments of the present invention will not be limited to the configurations and methods of the embodiments described above, but all or part of the embodiments will be selectively combined so as to be modified into various forms.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display apparatus comprising:
    a display comprising an active area for displaying an image and a black matrix adjacent to the active area; and
    an optical sheet coupled to the display,
    wherein the optical sheet comprises a Fresnel pattern portion corresponding to the black matrix and a portion of the active area, and
    wherein the Fresnel pattern portion comprises a plurality of peaks and a plurality of valleys and a depth of a first valley corresponding to the portion of the active area is less than a depth of a second valley corresponding to the black matrix,
    wherein depths of the plurality of valleys increase from one side of the Fresnel pattern portion corresponding to the portion of the active area to another side of the Fresnel pattern portion corresponding to the black matrix.

2. The display apparatus of claim 1, wherein the depths of the plurality of valleys gradually increase from the one side of the Fresnel pattern portion to the another side of the Fresnel pattern portion.

3. The display apparatus of claim 1, wherein the one side of the Fresnel pattern portion is positioned in front of the portion of the active area in a display direction and the another side of the Fresnel pattern portion is positioned in front of the black matrix in the display direction.

4. The display apparatus according to claim 1, wherein the Fresnel pattern portion has a width greater than a width of the black matrix.

5. The display apparatus according to claim 1, wherein the Fresnel pattern portion is configured such that a line passing through bottom points of the plurality of valleys corresponds to an aspheric curve.

6. The display apparatus according to claim 1, wherein the optical sheet further comprises a base portion disposed between the Fresnel pattern portion and the black matrix.

7. The display apparatus according to claim 6, wherein the base portion has a height greater than a width of the Fresnel pattern portion.

8. The display apparatus according to claim 6, wherein the base portion has a height ranging from 1 mm to 5 mm.

9. The display apparatus according to claim 6, wherein the base portion has a height greater than a width of the black matrix.

10. The display apparatus according to claim 1, wherein the Fresnel pattern portion is configured such that angles of the plurality of peaks decrease from the first side to the second side.

11. The display apparatus according to claim 1, wherein the Fresnel pattern portion is engraved at the optical sheet.

12. The display apparatus according to claim 1, wherein the Fresnel pattern portion is embossed at the optical sheet.

13. The display apparatus according to claim 1, wherein the optical sheet is a glass substrate.

14. The display apparatus according to claim 1, further comprising a bezel disposed along a side of the optical sheet and the black matrix.

15. The display apparatus according to claim 1, further comprising a bezel disposed along a side of the black matrix, wherein the optical sheet extends in front of the bezel in the display direction.

16. A display apparatus comprising a plurality of displays, wherein each display of the plurality of displays comprises:
an active area for displaying an image and a black matrix adjacent to the active area; and
an optical sheet coupled to the display,
wherein the optical sheet comprises a Fresnel pattern portion disposed to correspond to the black matrix and a portion of the active area, and
wherein the Fresnel pattern portion comprises a plurality of peaks and a plurality of valleys and a depth of a first valley corresponding to the portion of the active area is less than a depth of a second valley corresponding to black matrix,
wherein depths of the plurality of valleys increase from one side of the Fresnel pattern portion corresponding to the portion of the active area to another side of the Fresnel pattern portion corresponding to the black matrix.

17. The display apparatus of claim 16, wherein the depths of the plurality of valleys gradually increase from the one side of the Fresnel pattern portion to the another side of the Fresnel pattern portion.

18. The display apparatus of claim 16, wherein the one side of the Fresnel pattern portion is positioned in front of the portion of the active area in a display direction and the another side of the Fresnel pattern portion is positioned in front of the black matrix in the display direction.

19. The display apparatus according to claim 16, wherein the optical sheet comprises a base portion and a pattern portion, wherein the pattern portion is disposed in front of the base portion in a display direction and comprises the Fresnel pattern portion.

20. The display apparatus according to claim 19, wherein the base portion has a height greater than a width of the black matrix.

21. The display apparatus according to claim 16, wherein the Fresnel pattern portion is configured such that angles of the plurality of peaks decrease from the one side of the Fresnel pattern portion to the another side of the Fresnel pattern portion.

22. The display apparatus according to claim 16, further comprising a bezel disposed along a side of the black matrix, wherein the optical sheet extends in front of the bezel in the display direction.

23. The display apparatus according to claim 16, wherein the optical sheet is a glass substrate.

24. The display apparatus according to claim 16, wherein:
the plurality of displays comprises a first display adjacent to a second display; and
a single optical sheet extends from an active area of the first display to an active area of the second display.

25. The display apparatus according to claim 24, wherein:
a bezel is disposed between a first black matrix of the first display and a second black matrix of the second display; and
the single optical sheet covers the bezel in a display direction.

26. The display apparatus according to claim 25, wherein the single optical sheet comprises a first Fresnel pattern portion and a second Fresnel pattern portion positioned to be adjacent to each other.

27. The display apparatus according to claim 26, wherein the first Fresnel pattern portion and the second Fresnel pattern portion are symmetric with respect to a bisecting line corresponding to the bezel.

* * * * *